United States Patent [19]
McKinlay

[11] Patent Number: 6,039,524
[45] Date of Patent: Mar. 21, 2000

[54] SELF-LOCKING SAFETY WHEEL NUT WITH LOCKING WRENCH

[75] Inventor: Alistair N. McKinlay, Marina Del Rey, Calif.

[73] Assignee: Hong Kong Disc-Lock Company Limited, Wanchai, The Hong Kong Special Administrative Region of the People's Republic of China

[21] Appl. No.: 09/152,529

[22] Filed: Sep. 14, 1998

[51] Int. Cl.[7] .............................. F16B 39/24; F16B 43/00
[52] U.S. Cl. .......................... 411/149; 411/136; 411/405; 411/533
[58] Field of Search .................................. 411/136, 145, 411/149, 150, 432, 533, 405

[56] References Cited

U.S. PATENT DOCUMENTS

| | | | |
|---|---|---|---|
| 3,329,190 | 7/1967 | Oldenkott | 411/149 X |
| 5,080,545 | 1/1992 | McKinlay | 411/149 |
| 5,090,855 | 2/1992 | Terry | 411/149 X |
| 5,203,656 | 4/1993 | McKinlay | 411/149 |
| 5,324,149 | 6/1994 | Bainbridge et al. | 411/405 X |
| 5,409,338 | 4/1995 | McKinlay | 411/149 |
| 5,626,449 | 5/1997 | McKinlay | 411/149 |
| 5,688,091 | 11/1997 | McKinlay | 411/149 |

*Primary Examiner*—Neill Wilson
*Attorney, Agent, or Firm*—Charles W. Chandler

[57] ABSTRACT

A wedge lock fastener assembly includes a threaded nut having a peripheral flange, a wedge lock end face, and plural wrench-receiving notches in said flange. An associated washer has a peripheral skirt encircling the nut flange, a wedge lock face, and plural tabs extending angularly from the skirt across the peripheral flange so that the washer is captively retained on the nut. Peripheral notches in the washer are adapted to align with the notches in the nut, such that a special wrench can be extended into the aligned notches for loosening the nut and washer as a unit.

12 Claims, 6 Drawing Sheets

SELF-LOCKING SAFETY WHEEL NUT WITH LOCKING WRENCH

BACKGROUND OF THE INVENTION

Self-locking fastener assemblies having cammed wedge locking surfaces are known in the art. See for example my prior patents: U.S. Pat. No. 5,626,449 issued May 6, 1997, for "Wedge-Locking Fastener Assembly with a Cammed Flange"; U.S. Pat. No. 5,409,338 issued Apr. 25, 1995, for "Wedge-Action Lock Washer Assembly Having Coupled Washers"; U.S. Pat. No. 5,203,656 for "Self-Centering, Self-Tightening Fastener"; and, U.S. Pat. No. 5,080,545 issued Jan. 14, 1992, for "Lock Washer Assembly Having Wedge Lock Action".

The fastener includes a nut and a specially formed washer. Typically, means are provided for retaining the washer with the nut to assist in connecting the fastener to a workpiece. In my prior co-pending patent application, I disclose such a fastener which included a cup-shaped washer having an integral annular cylindrical skirt that extends around the edge of the flange of the nut. Tabs extend radially inwardly from the periphery of the skirt over the flange in such a manner that the washer can move axially as well as rotate with respect to the nut to permit the wedge-locking cams to wedge the nut between the cams on the washer and the threads on the bolt on which the nut is fastened. When the nut is turned in a tightening direction, it tightens the washer on the workpiece. When the nut tends to rotate in the loosening direction, such as in response to vibration, the washer remains fixed but the nut becomes tighter in the manner described in my prior patents.

One of the problems in connection with using such self-locking fasteners is that occasionally it becomes necessary to loosen the fastener from the workpiece. This is usually achieved by connecting a tool on the back side of the workpiece to the head of the bolt and unloosening the bolt while holding the nut and the washer together as a unit. Occasionally it is impossible or difficult to reach the head of the bolt. It is desirable to remove the fastener without going through the difficulty of destroying the fastener.

SUMMARY OF THE INVENTION

The broad purpose of the present invention is to provide an improved self-locking wheel nut with a captive washer similar to that illustrated in my prior co-pending patent application, but which permits the user to disengage the nut and the washer from the bolt. Apertures in the flange of the nut and in the washer permit a wrench to simultaneously turn both the washer and the nut in the loosening direction. The cup-shaped washer cannot be turned with the nut without a special wrench or tool.

The tool has several pin-shaped elements that engage the washer and a hexagonal-shaped opening that receives the hexagonal head of the nut to provide greater security so that the fastener cannot be removed by unauthorized users.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
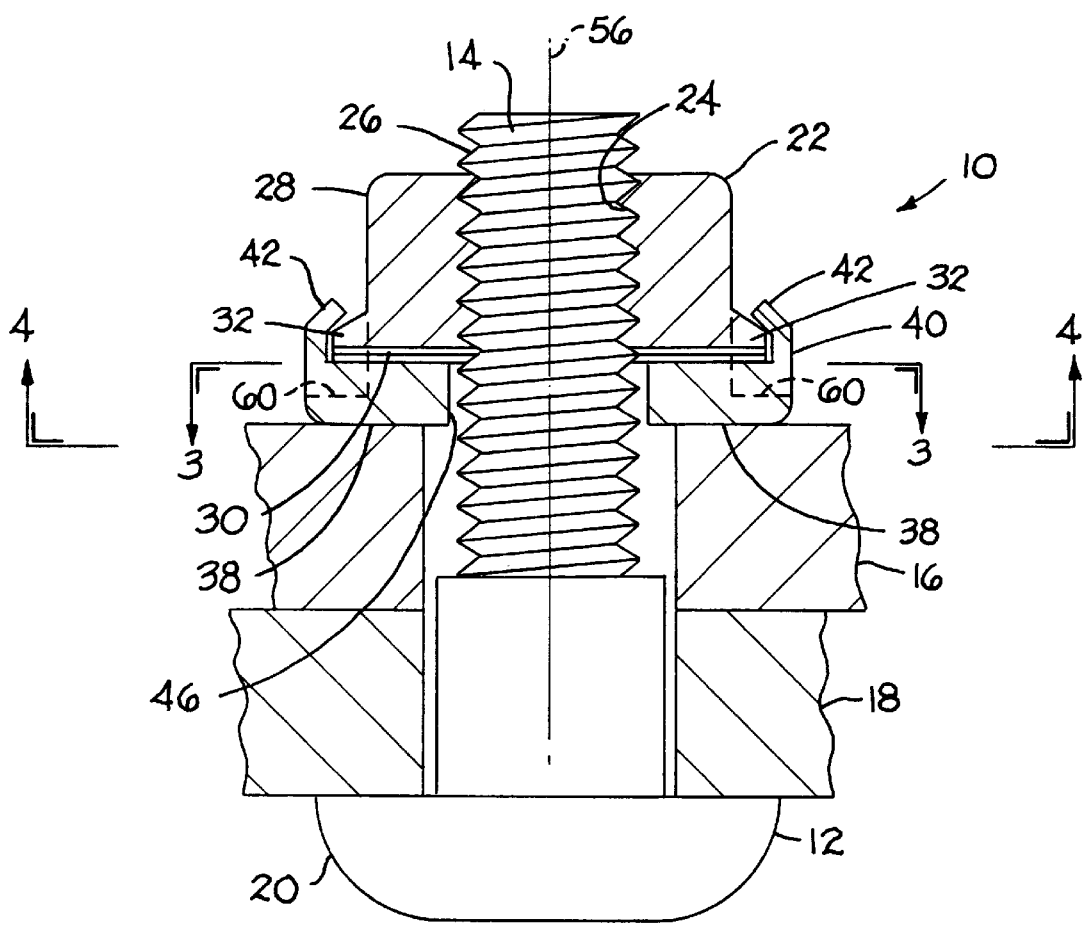
FIG. 1 is a sectional view of a nut with a captive cupped shaped washer illustrating the preferred embodiment of the invention.

FIG. 1 shows a fastener assembly 10 illustrating the preferred embodiment of the invention. Fastener assembly 10 is mounted on a steel bolt 12 having a threaded shank 14 extending through two workpieces 16 and 18. The bolt has a conventional button-shaped head 20 to prevent the head from being gripped by a wrench or pliers.

A wear-resistant steel nut 22 has an internal threaded bore 24 meshed with a continuous helical thread 26 on the bolt shank. The nut is fastened on the bolt by a conventional wrench, not shown, engaging a multi-sided head 28. Preferably head 28 has six flat sided surfaces arranged in the conventional hexagonal configuration. The nut has a bottom camming face 30 forged with an integral annular flange 32. Flange 32 has a diameter larger than the maximum diameter of the nut head. Consequently, the bottom face of the flange has a larger surface area than the hexagonal cross section of the nut head. Bottom camming face 30 comprises six steeply sloped shoulders 31 and six shallow sloped ramps 33 interspersed to form an undulating cam surface.

Figure 7:
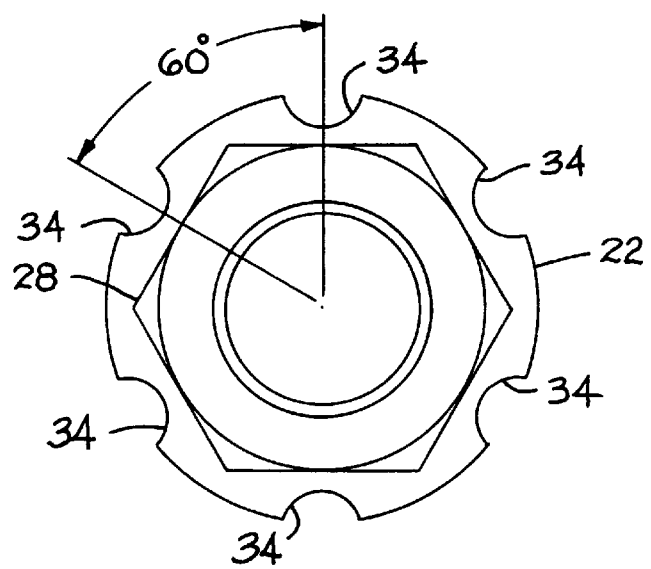
FIG. 7 is a top plan view of the nut.

Referring to FIG. 7, the flange of the nut has six equally spaced semi-round notches 34. Although illustrated as being round, the notches could take other configurations, such as a square configuration.

The notches are wrench-receiving notches. Note that the notches are located 60° apart, each notch being located or aligned with the center of its respective flat surface on the hexagonal head, as illustrated in FIG. 7.

Figure 2:
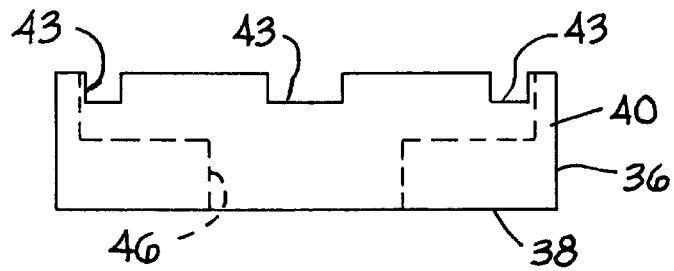
FIG. 2 is a elevational view of the washer prior to being mounted on the flange of the nut.

A steel, non-flexing washer 36 is captively mounted on the nut. The washer has a generally planar lower face 38 connected to an integral annular skirt 40 which extends toward the nut and around flange 32. The upper edge of the skirt has a plurality of retaining tabs 42 that extend radially inwardly toward the nut head and above the top of the flange as illustrated in FIG. 1. The tabs are equi-annularly spaced and permit the nut flange to rotate in the washer skirt, while also permitting a sufficient axial motion with respect to the washer so that the camming faces of the nut and washer can slide to provide a desired wedge locking action. The retaining tabs are spaced a sufficient distance so that a special wrench 62 can be inserted between the retaining tabs into the notches 34 of the nut flange. FIG. 2 shows the washer prior to placement on nut 22. Tabs 42 are bent onto the upper surface of the nut flange 32 after the washer is in placed on the nut. Tabs 42 are spaced apart by six notches 43.

Figure 12:
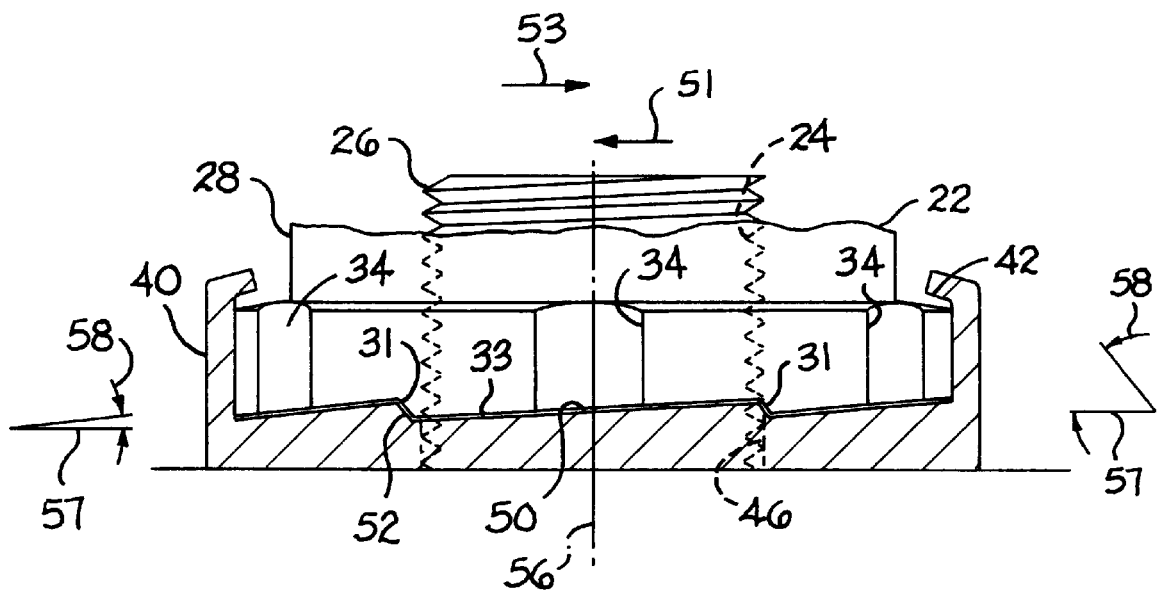
FIG. 12 is a view of a typical camming ramp and shoulder system formed by mating surfaces on the nut and washer.

The work-engaging face 38 of the washer is flat and devoid of any obstruction so that it can slide on the workpiece. The inside of the washer has a central non-threaded opening 46 for receiving the bolt shank. The upper surface of the washer has a camming face with six camming structures 48 which are identical and equally spaced around the washer; each camming structure comprises a ramp 50 and shoulder 52. The camming ramps 50 and shoulders 52 are identical and arranged in such a manner that when the nut is turned in the tightening direction, the shoulders on the nut push the shoulders on the washer as the nut becomes tightened with the washer on the bolt. In FIG. 12 the nut-tightening direction is indicated by numeral 51 (clockwise viewed from above the nut).

Figure 8:
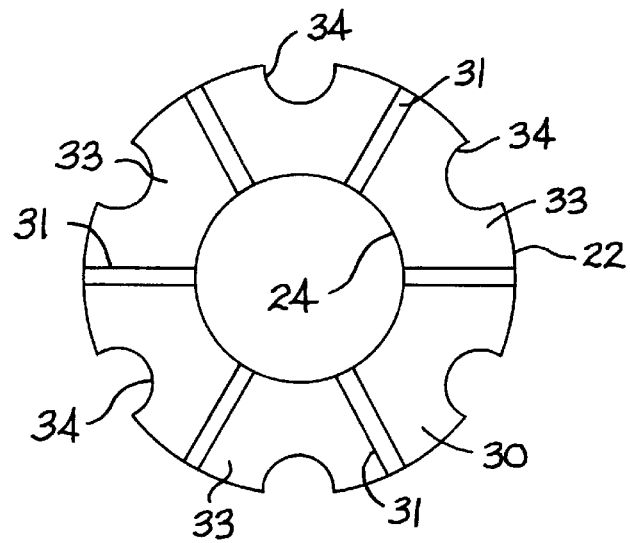
FIG. 8 is a bottom plan view of the nut.

A typical camming ramp and shoulder are illustrated in FIG. 12. The slope angle 54 of the shoulder is about 40°. The term "slope angle" designates the angle that shoulder 52 makes with respect to an imaginary radial plane 57 extending normal to the nut turning axis 56. The slope angle 58 of each ramp 50 is about 8°. The shoulders and the ramps of each camming surface are so connected that each camming face has a continuous uninterrupted undulating contour. The fastener can also function with a single ramp and shoulder on the camming faces of the nut of the washer or a greater number than shown in FIG. 8.

Figure 3:
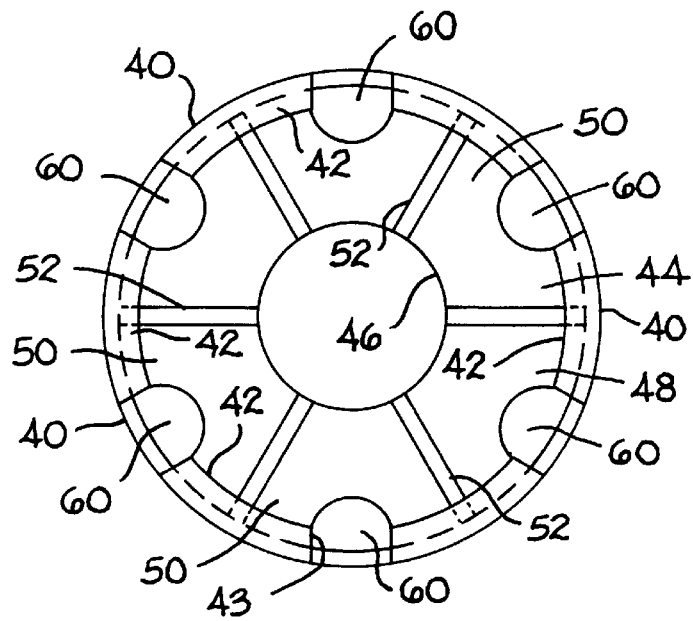
FIG. 3 is a top plan view of the washer taken on line 3—3 in FIG. 1.
Figure 4:
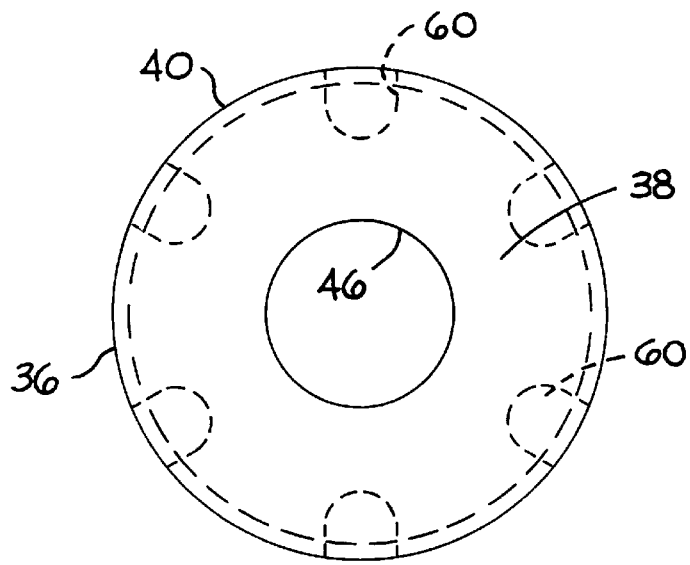
FIG. 4 is a bottom view of the washer taken on line 4—4 in FIG. 1.
Figure 5:
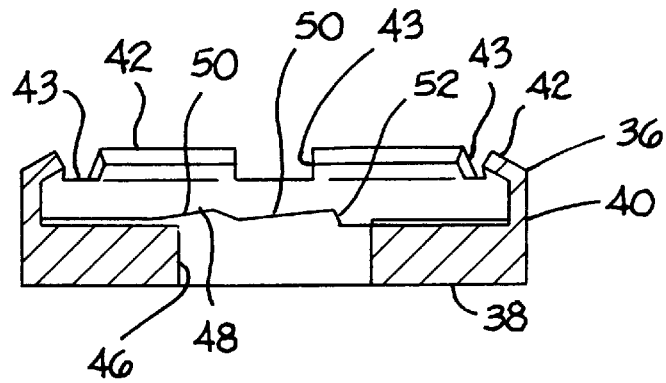
FIG. 5 is a sectional view of the washer.
Figure 6:
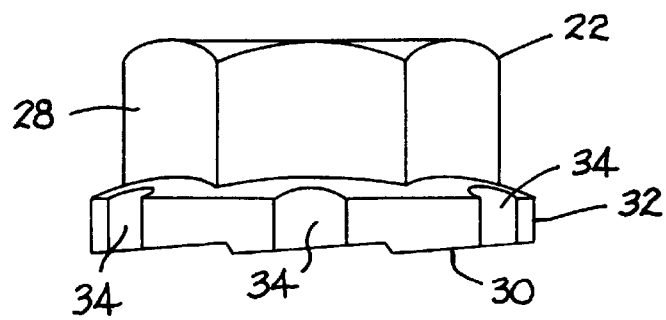
FIG. 6 is an elevational view of the nut.

The washer has six internal, rounded notches 60 that are axially aligned with notches 43 in skirt 40. As shown in FIG. 3, notches 60 have a semi-cylindrical configuration; notches 60 are equi-angularly spaced around the cammed internal surface of the washer.

Figure 10:
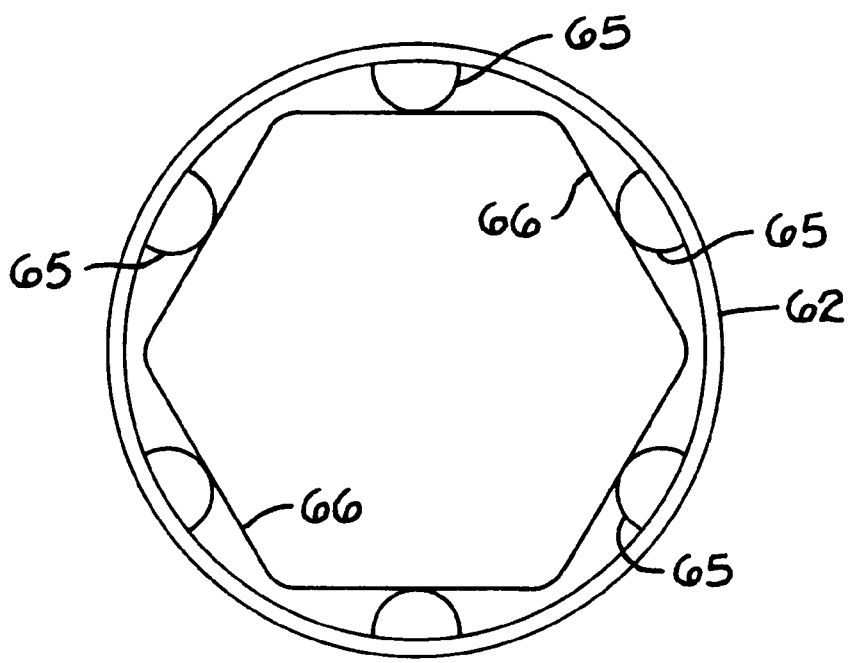
FIG. 10 is a view of the opposite end of the wrench.
Figure 11:
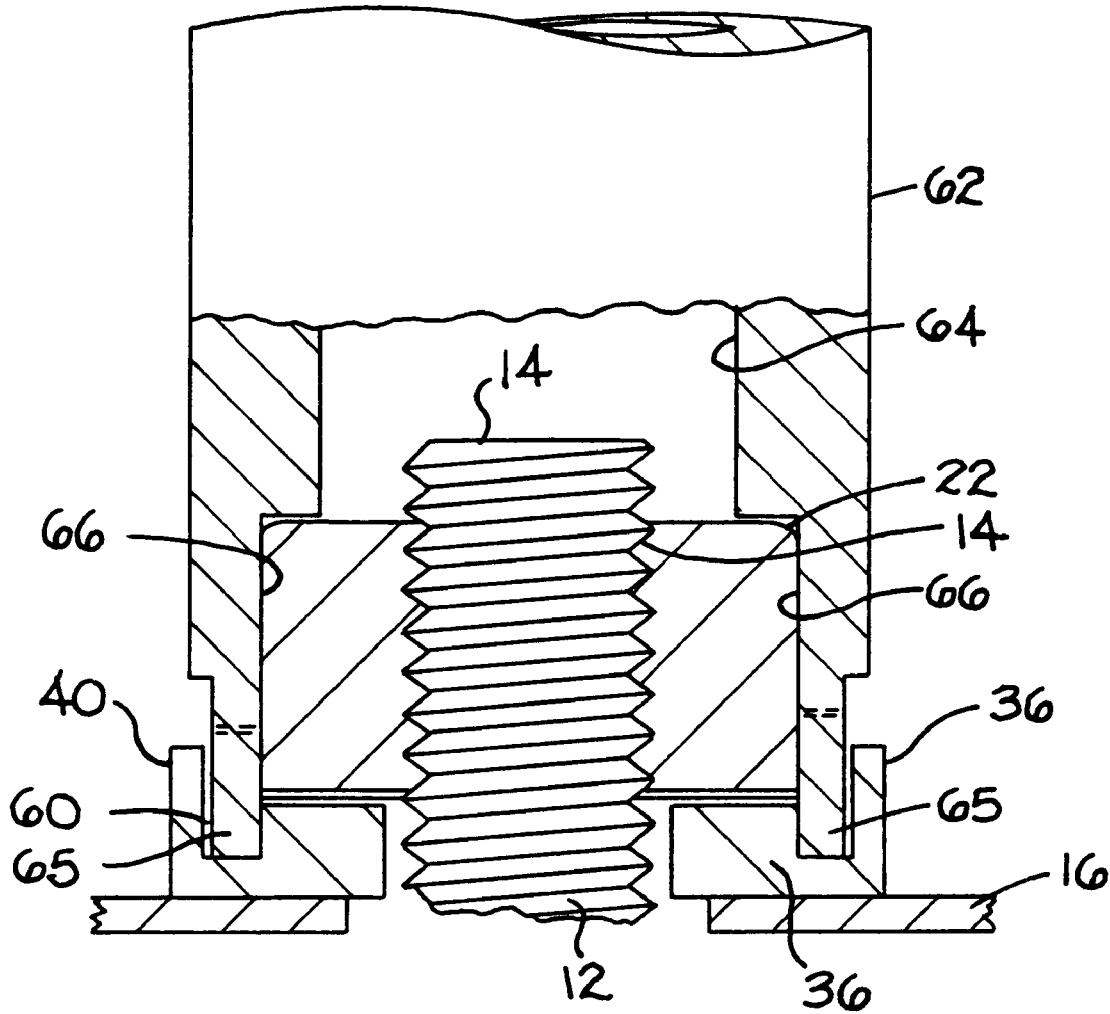
FIG. 11 is a fragmentary view showing how the wrench engages the notches in the flange of the nut and the washer.

Notches 60 are intended to be aligned with the notches 34 in the nut flange when the nut and washer are to be loosened. Each of the notches in the washer has the same circumferential spacing and radial spacing from the center of the bolt as the notches in the nut flange so that an elongated tubular steel wrench 62, illustrated in FIGS. 9–11, can be seated on the washer for the purpose of turning the washer and nut in the loosening direction. The tubular wrench has six prongs 65 insertable into the notches 60 of the washer and the notches 34 of the nut. Prongs 65 have the same shape as notches 60 and 34.

The wrench has a hollow center 64 for receiving the bolt, an internal hexagonal surface 66 which engages the six flat sides of the nut head. The wrench is then turned in the counter-clockwise direction as viewed in FIG. 7, to loosen the nut and the washer as a unit from the bolt and workpiece. In FIG. 12 the loosening direction is referenced by numeral 53.

In use, the nut is threaded on the shank of the bolt by rotating the nut in the clockwise direction when viewing the top of the nut. During the nut tightening operation, the bottom face of the washer becomes frictionally anchored to workpiece 16. Further rotation of the nut in the same direction causes the cammed shoulders 31 on the nut to push the cammed shoulders 52 on the washer until the nut is fully tightened, applying tensile stress on the bolt shank. In the tightened position shoulders 31 can be engaged with shoulders 52, as shown in FIG. 12, or spaced from shoulders 52, depending on the tensile force generated in the bolt shank. In most situations however the nut will be tightened to a position in which shoulders 31 are engaged with shoulders 52.

When the nut is rotated in the opposite or loosening direction, either by friction or deliberately, the cammed ramps 33 on the nut slide up the cammed ramps 50 on the washer. The nut thus moves to a wedged, locked position between the washer ramps and the threads on the bolt shank. The lock action is enhanced by the fact that the axial thickness dimensions of each shoulder 52 is less than the thread pitch distance on the bolt shank.

Figure 9:
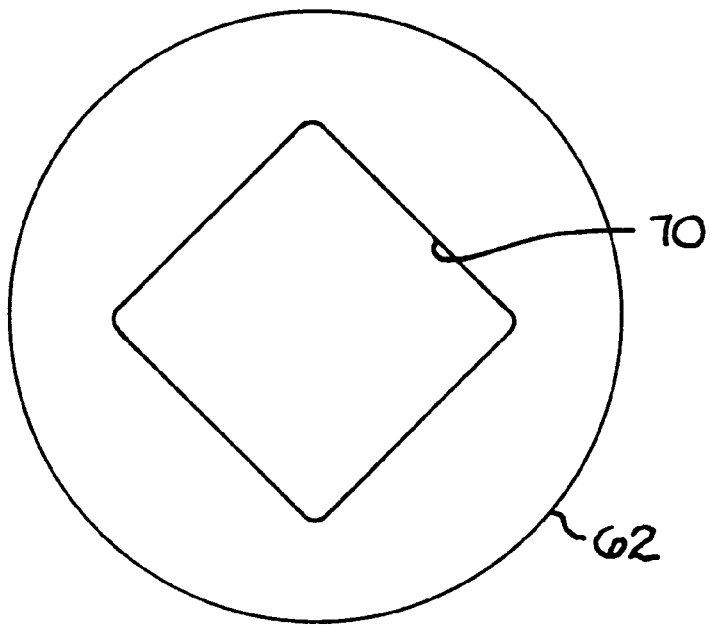
FIG. 9 is a view of one end of the unlocking wrench.

Referring to FIG. 9, the opposite end of the wrench has square opening 70 for receiving a power tool (not shown) for turning the wrench in the loosening direction.

Figure 13:
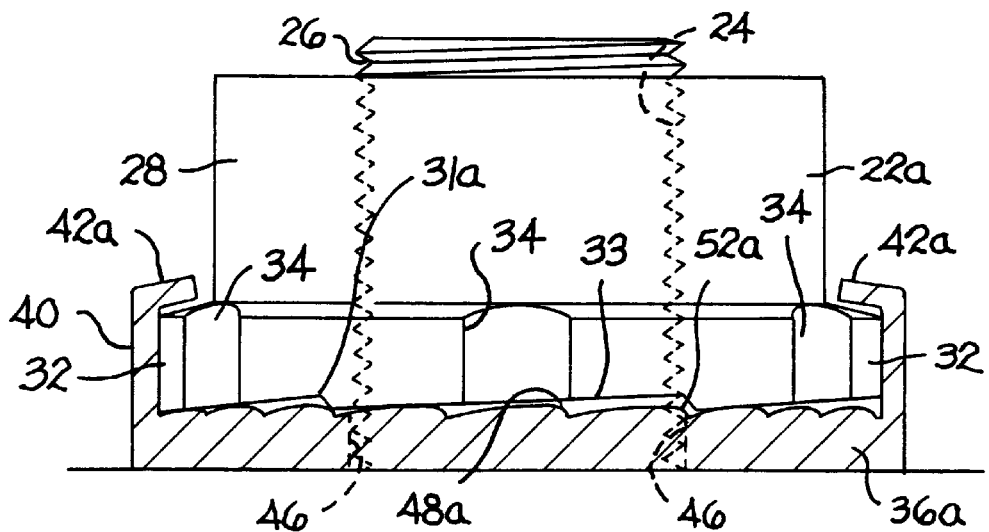
FIG. 13 is a sectional view of an alternative cup shaped washer.

FIG. 13 shows an alternative construction embodying the invention. In the illustrated construction the cammed surface 48a on washer 36a has more ramp-shoulder combinations than the camming face 30a on nut 22a. In one representative arrangement there are eighteen ramp-shoulder combinations on washer 36a and six ramp-shoulder combinations on nut 22a. With such an arrangement the nut can have a relatively large number of rotated positions wherein the shoulders 31a on the nut are in contact with selected shoulders 52a on washer 36a.

The FIG. 13 construction also differs from the FIG. 12 construction in that there are no notches in the washer cammed surface 48a. The cammed surface 48a extends from central opening 46 to the annular skirt 40 along the entire circumferential span of cammed surface 48a.

Skirt 40 has six circumferentially spaced tabs 42a and associated notches, as in the washer construction disclosed in the FIG. 1 embodiment. Nut 22a can be identical to nut 22, such that six notches 34 are formed in the nut flange 32 (similar to the arrangement depicted in FIG. 8). The six tabs 42a on washer 36a have the same circumferential spacing as notches 34 on nut flange 32. Therefore, the wrench depicted in FIGS. 9 through 11 can be used for loosening the nut-washer assembly depicted in FIG. 13.

When wrench 62 is used for loosening the FIG. 13 nut-washer assembly the six prongs 65 on the wrench are inserted through the notches (spaces) between tabs 42a into notches 34 in nut 22a. The wrench is then turned (e.g. by a power tool keyed to square opening 70) so that prongs 65 simultaneously exert turning forces on the washer tabs 42a and the notch 34 surfaces. The nut and washer are thereby simultaneously loosened.

The invention contemplates a wedge lock fastener assembly that is resistant to loosening by vibrational forces or normal wrench action, but is loosenable with a specially designed wrench.

Having described my invention, I claim:

1. A wedge lock fastener assembly comprising:
   a threaded nut having a first wedge lock surface, a peripheral flange and first plural circumferentially spaced notches located in said peripheral flange;
   a locking washer having a second wedge lock surface and second plural circumferentially spaced notches;
   the notches in said washer having the same spacing as the notches in said nut, whereby a tool having circumferentially spaced prongs can be placed so that the prongs extend into the notches in the nut and the washer, after which the tool can be turned to simultaneously loosen the nut and the washer.

2. The fastener assembly of claim 1, wherein said washer has a peripheral skirt encircling said peripheral flange on the nut, and tab means extending from said skirt across said peripheral flange to prevent separation of said washer from said nut.

3. The fastener assembly of claim 2, wherein said second notches are located in said tab means.

4. The fastener assembly of claim 1, wherein said second notches are located in said second wedge lock surface.

5. The fastener assembly of claim 3, wherein said second notches are located in said tab means and said second wedge lock surface.

6. The fastener assembly of claim 1, wherein each said wedge lock surface has an undulating profile.

7. A wedge lock fastener assembly comprising:
- a threaded nut having a central axis and a peripheral flange radiating away from the central axis; said nut having a first wedge lock end face and first plural circumferentially spaced notches extending through said flange and said wedge lock end face;
- a locking washer having a first flat surface and a second wedge-lock face mated to said first wedge lock face on said nut;
- said washer having a peripheral skirt encircling said peripheral flange and tab means extending angularly from said skirt across said flange so that the washer is captively retained on the nut;
- and second plural circumferentially spaced notches on said washer alignable with said first notches.

8. The fastener assembly of claim 7, wherein said first notches are located in said peripheral flange.

9. The fastener assembly of claim 8 wherein said second notches are located in said second wedge lock washer.

10. The fastener assembly of claim 8, wherein said second notches are located in said tab means and said second wedge lock surface.

11. The fastener assembly of claim 8, wherein said second notches are located in said tab means.

12. The fastener assembly of claim 8, wherein each said wedge lock surface has an undulating profile.

* * * * *